G. Eichenseer,
Horse Power.

N° 60,159. Patented Dec. 4, 1866.

Witnesses.
Geo. B. Mitchell Jr.
Chas. H. Doyle.

Inventor:
Geo. Eichenseer
By his Atty
M. K. Randolph & Co.

United States Patent Office.

IMPROVEMENT IN HORSE POWERS.

GEORGE EICHENSEER, OF WATERLOO, ILLINOIS.

Letters Patent No. 60,159, dated December 4, 1866.

SPECIFICATION.

TO ALL WHOM IT MAY CONCERN:

Be it known that I, GEORGE EICHENSEER, of Waterloo, in the county of Monroe, and State of Illinois, have invented a new and useful Horse Power; and I do hereby declare that the following is a full and exact description thereof.

The nature of my invention is, firstly, in the use of a stationary but adjustable centre shaft, around which the parts in motion revolve; said moving parts consist principally of a drum frame composed of segments, supported on caster-wheels, all said parts being flexibly joined, said drum frame being again flexibly joined by arms with a central collar revolving on the centre shaft. As it is the object of said drum frame to act as driving-pulley to a band or belt through which power is to be transmitted, the general shape thereof is hereby determined; moreover, as I apply the animal power to the arms connecting said drum with the centre collar, inside, therefore, of said drum, I arrange said drum in segments, as aforesaid, which may be disconnected in such wise as to admit the animal or animals giving the power to the proper positions in the interior.

To enable those skilled in the arts to make and use my said improved machine, I will now describe its detail construction and application, referring herein to the accompaning drawings, and to the letters of reference marked thereon, of which similar letters indicate similar parts. Of said drawings—

Figure 1:
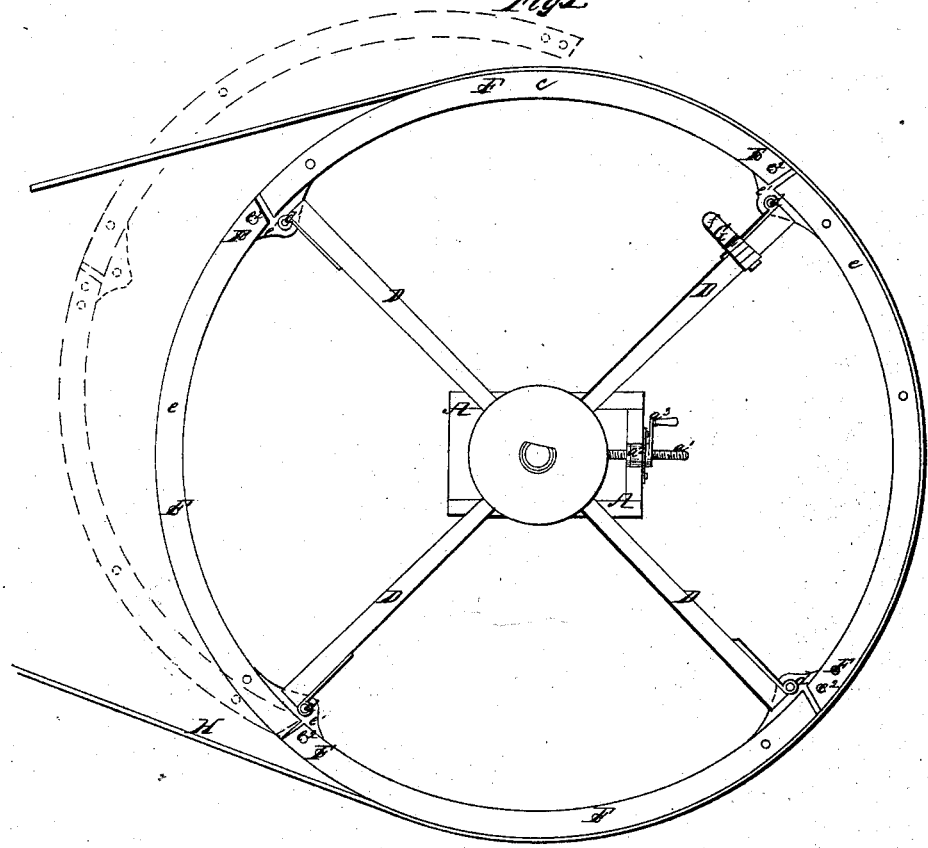
Figure 1 is a general plan, showing in red lines one of the drum segments opened for the passage of the horse, &c.
Figure 2:
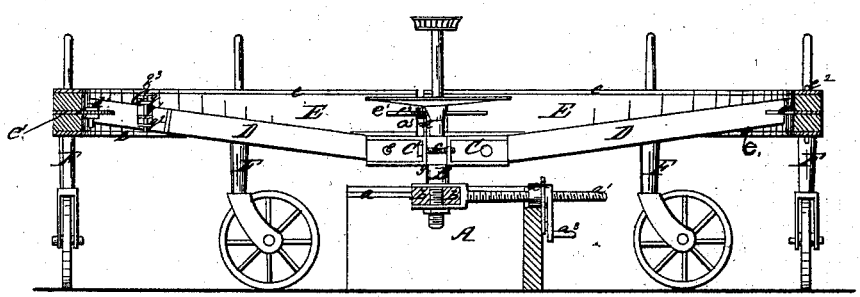
Figure 2 is a central vertical sectional elevation.

I construct of any economical material, such as wood or cast iron, the centre box, A, which forms the support for the centre shaft, B, around which all moving parts revolve; said shaft, B, stands vertically, and is at its lower end supported in the head, $b$, which is arranged to slide in proper ways, $a$, of the box, A; this sliding motion of $b$ is regulated by a screw-shaft, $a^1$, which is made to move horizontally by the screw-nut, $a^2$, which, on being turned by a handle, $a^3$, and being prevented from motion otherwise, causes the screw-shaft to move horizontally, thereby moving the head, $b$, in the ways or guide-slots of the box, A; thus it will be seen that the centre shaft, B, is made to move horizontally, thereby causing all parts connected therewith properly to perform said motion. The collar or hub, C, surrounds B, resting on a collar, $b^1$, thereof; said collar, C, turns loosely around B, and receives in its radial arms the arms or spokes, D, and these connect with a ring drum or frame, E. The arms, D, are secured in C by the horizontal bolt-rods, $c$, thus allowing the outer ends of said arms to vibrate in a vertical direction; said parts, B and C, are usually of metal, whereas the arms, D, will economically be of wood. It will then be seen that the ring frame or drum, E, is compelled to revolve about B as a centre. For the further support and guidance of E, I arrange the caster-wheels, F. The animal power is attached to a clevis, G, secured to the arms, D, within the frame, E; said clevis is arranged to receive the draught ring or hook of the single or double tree of the usual harnessings in any of three parts, $g$, $g^1$, and $g^2$, thereby accommodating this attachment to the height of the animal, and to the levels of the ground, &c. One pin, $g^3$, secures the hook or ring aforesaid, in either of its positions, to the clevis, and thereby to the arm, D; then the power, being applied to the arms, D, will cause the frame, E, to revolve about B. As it will, however, usually be necessary to pass the animal for the attachment thereof through the circuit of the ring, E, this is, therefore, as well as for the convenience of transportation as well as to give flexibility to said ring, made of segments, $e$. Usually each segment, $e$, is supported on two casters, F, the shaft of the caster passing vertically through the body of the segment and permitting the segment to lift and otherwise move in the vertical direction prescribed by its connection with the arms, D, and the connection thereof with the collar, C. To connect any two adjoining segments, $e$, I use a joint piece, (usually wrought iron,) $e^1$, mortised in the body of one of said pieces and secured thereto; said piece, $e^1$, passes into a proper mortise of the other piece, and a pin, $e^2$, secures the same; by withdrawing said pin said connection is easily opened. The same joint piece, $e^1$, connects with a mortise in the arm, D, and a pin, $d^1$, here secures this connection; by withdrawing this pin this connection is easily broken. Owing to this arrangement, when it is necessary to pass an animal to the inside of the ring frame, E, I can easily, by withdrawing the pins, $e^2$, at each end of the contiguous segment, $e$, and withdrawing one pin, $d^1$, then cause this segment to move radially about the other pin, $d^1$, as a centre, causing the segment to assume the position fully shown in red lines, fig. 1. When the animal power source has been attached, and the ring frame, P, been completed, a driving belt or band, H, is passed around the outer circumference of E, thus causing E to act as driving-pulley to said belt, and by means of said belt, H, transmitting the power to any point desired.

Now, as by the handle, $a^3$, and screw-shaft, $a^1$, &c., the centre shaft may be moved horizontally, and as the transmission of power by H is in a horizontal direction, the belt, H, can be tightened or otherwise adjusted by said adjusting mechanisms, $a^3$, $a^2$, $a^1$, &c., before mentioned. As was stated, the vertical shafts of the casters pass through the body of each segment, $e$; they pass also above the same, thereby permitting the band, H, to catch and guide thereon in case the same slips off from the outer rim of E; in a similar manner the belt is guided below E on the caster shafts. The animals within the circumference of E are thus protected against the belt, H. The caster-wheels, F, may run on a track or on the usual surface of the earth. To accommodate all inequalities of surface, which cause a vibratory or irregular movement of parts, I have, as above stated, arranged the said rim drum, E, in segments, and joined the same flexibly to the arms, D; moreover, these are joined flexibly to the collar, C. Again, the segments may move vertically upon the caster shafts to effect said adjustment.

Having thus fully described my invention, what I claim, is—

1. The arrangement of the shaft B for horizontal adjustment, thereby tightening the driving-belt H, substantially as set forth.

2. The flexible joint of the parts C and D, as set forth.

3. The arrangement of the drum E in sections, $e$, and their combination with each other and with the arms D, as set forth.

4. The arrangement of the supporting casters F, and their combination with the segment $e$, as set forth.

5. The caster shaft as a guide for the belt H after it has slipped, substantially as set forth.

GEORGE EICHENSEER.

Witnesses:
    GEO. P. HERTHEL, Jr.,
    S. M. RANDOLPH.